Dec. 15, 1964  C. E. CONKLIN  3,161,459
AUTOMATIC NULL-BALANCING ELECTRICAL MEASURING RECORDERS
Filed Feb. 27, 1962  4 Sheets-Sheet 1

INVENTOR.
CHARLES E. CONKLIN
BY
Sughrue, Rothwell, Mion & Zinn
ATTORNEYS

Dec. 15, 1964  C. E. CONKLIN  3,161,459
AUTOMATIC NULL-BALANCING ELECTRICAL MEASURING RECORDERS
Filed Feb. 27, 1962  4 Sheets-Sheet 2

INVENTOR.
CHARLES E. CONKLIN
BY
*Sughrue, Rothwell, Mion & Zinn*
ATTORNEYS

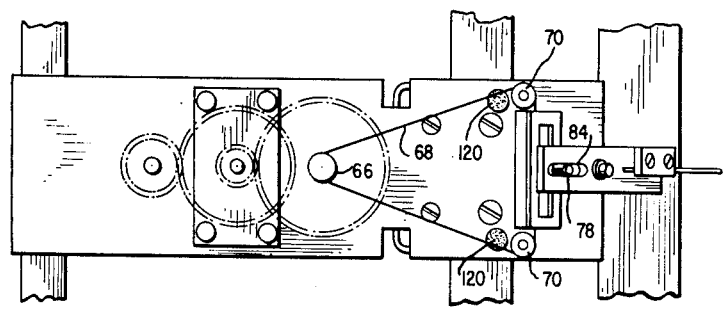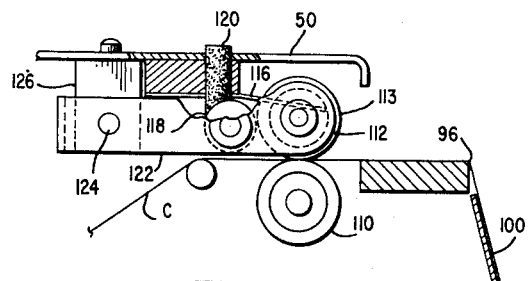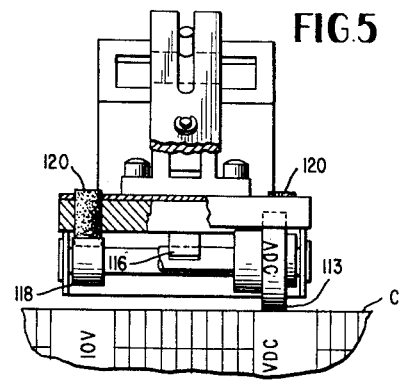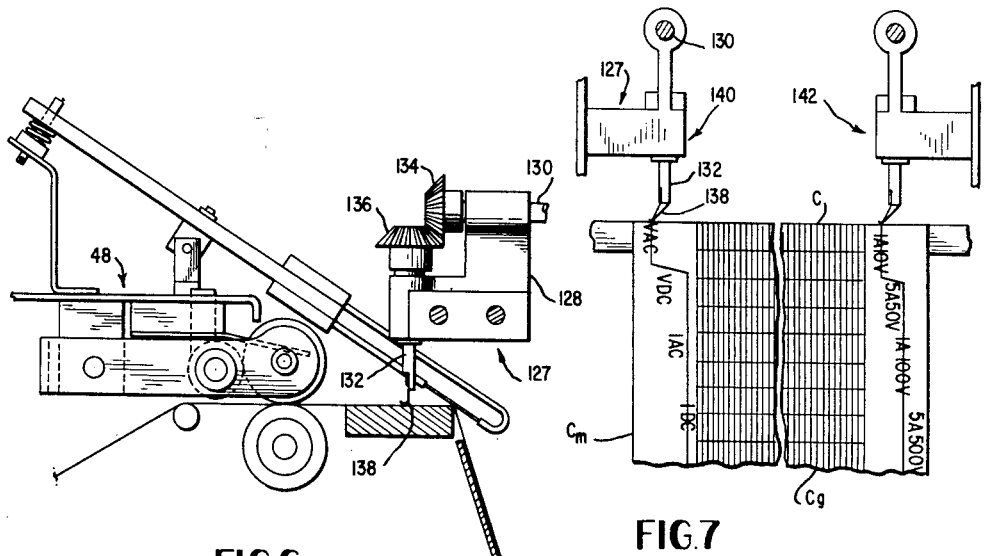

Dec. 15, 1964 C. E. CONKLIN 3,161,459
AUTOMATIC NULL-BALANCING ELECTRICAL MEASURING RECORDERS
Filed Feb. 27, 1962 4 Sheets-Sheet 4

INVENTOR.
CHARLES E. CONKLIN
BY
*Sughrue, Rothwell, Mion & Zinn*
ATTORNEYS

United States Patent Office 3,161,459
Patented Dec. 15, 1964

3,161,459
AUTOMATIC NULL-BALANCING ELECTRICAL
MEASURING RECORDERS
Charles E. Conklin, Main St., Pleasant Valley, N.Y.
Filed Feb. 27, 1962, Ser. No. 176,150
13 Claims. (Cl. 346—145)

This invention relates to improvements in automatic null-balancing electrical measuring recorders.

Recorders are commonly used for the translation of primary source information into a visual indication and permanent chart records. One well known type of recorder employs the null-balance principle of measurement by utilizing a potentiometer type measuring circuit that will continuously measure and record the output of many transducers such as thermocouples, or any other device that will produce a measurable electrical output within the range of the instrument.

Potentiometric recorders are designed to very accurately measure, indicate and record D.-C. voltages. The recorder makes this measurement by comparing an accurate, known voltage (applied across a slidewire) to the voltage to be measured. The self-balancing recorder automatically changes the known voltage until it equals the voltage to be measured. At this time, the system is said to be at balance. The known voltage (and therefore, the unknown voltage) is indicated and recorded. This is accomplished as follows: The difference between the voltage to be measured and the known voltage appears across an amplifier. This is known as an "error signal." The error signal is amplified to a magnitude of power sufficient to drive a servo motor. The motor controls the magnitude of the known voltage by driving the slidewire always in such a direction so that the known voltage approaches the voltage being measured. When the two voltages are equal, the error signal is equal to null. Consequently, the motor which is driven by an error signal of zero magnitude, stops and the system reaches null-balance.

This application relates to improvement in the mechanical construction of recorders. Although the electrical circuit of potentiometers is well known, the mechanical construction of prior recorders is limited as far as reliability, serviceability and economy is concerned.

The known potentiometric records of the null self-balancing type commonly contain a single or dual channel input for recording a single or two variables at one time. Although multiple channel potentiometric recorders are not unknown, multiple channel recorders (for more than two variables) for recording multiple information at the same time on one visible graph are quite expensive and complex. It is one of the primary objects of this invention to provide a unique potentiometric null-balance recorder system utilizing a unique modular construction so that a number of channels in the recorder may be provided merely by a number of identical side by side modules.

In a recorder, it is highly desirable that the construction allows for rapid service in the event of failure. Replaceable and interchangeable modules eliminate the possibility that a recorder will be out of service for a long period of time.

Also, by constructing the recorder with a number of modules, a wide range of functions may be recorded merely by switching or interchanging modules having identical physical dimensions but different electrical circuits to allow recording of different variables. For example, a potentiometer module could be replaced by a Wheatstone bridge module for measuring resistance.

Ordinarily, the chart paper to be used for recording variables in a recorder of this type is preprinted with the function of the variable to be recorded and the range of this function. Because of the large number of possible variables and ranges an extremely large inventory of chart paper must be kept. This invention provides a means for printing the function and range of the variable being recorded on the chart paper as it moves through the recorder. Thus, chart paper having blank margins can be inserted in the recorder and the need for a large inventory of preprinted chart paper is eliminated.

It is a further object of this invention to provide a potentiometric recorder construction including: an extremely accurate and inexpensive chart drive arrangement, an assembly for indicating the footage remaining on the chart paper contained within the recorder, a reroll mechanism which permits the record to be rerolled as the chart exits from the recorder, means for applying timed markings to the chart so that the speed of the chart will be a permanent record, a pivotally mounted stylus arrangement having faithful linear movement even though it is pivotally mounted.

A better understanding of the invention together with further objects and advantages thereof will be further understood from a consideration of the following description taken in connection with the accompanying drawings.

In the drawings:

FIG. 3 is a top elevation view of a servo rack and recording stylus module;

FIG. 4 is a side elevation view partially in a section of a portion of the servo rack and stylus module showing the printing on graph paper as the chart is driven;

FIG. 5 is a front elevation view also partially in section for the sake of clarity further illustrating the printing feature shown in FIG. 4;

FIG. 6 is a side elevation view partially in section illustrating a further modification and feature of marking and identifying the particular function and range being recorded;

FIG. 7 is a front elevation view of a portion of the device shown in FIG. 6 illustrating its usage;

In general, the recorder of this invention utilizes the null self-balancing potentiometric circuits which are known in the art for driving a recording stylus in accordance with an input variable. The recorder has a unique mechanical modular construction and a number of other features providing over-all improved results in economy, serviceability, operational capability, accuracy, reliability and the like.

The recorder may be constructed as a multiple channel instrument having any number, usually an even value or quantity, of input channels or may be a single channel multifunction and multirange recorder. The multichannel construction is unique in that the modules from which it is constructed may be duplicated for each channel, thus requiring only a small number of standard parts allowing for ease in service. The three basic modules of the recorder include a measuring circuit module for each channel, an amplifying board module for each channel and a servo rack module which includes the writing stylus for each channel. Heat sensitive graph paper is driven in any desired speed by a unique drive means and the graph paper includes divided grid markings for a heated stylus to record in each channel. At the side of the grid markings, in the margins of each channel, the chart paper is supplied blank and the recorder contains interchangeable printing means for printing the function and range of the recording channel at the time the chart paper is used. This allows a great number of different functions and variables to be recorded on the same chart paper, thus allowing any inventory of chart paper to be decreased substantially. The only thing that need be changed for recording different functions and range is a small printing roller which is easily detachable from the servo rack and stylus module.

As a modification of a single channel multifunction, multirange recorder, the recorder includes not only means to print the functions and ranges as the recorder is being used, but also includes means to select which function and which range is being recorded by marking through the particular function and range printed in the margins of the graph paper.

Also provided on the recorder is a footage indicator to indicate the amount of chart paper remaining and a chart paper reroll assembly for rewinding the chart paper. A chart paper speed marker is also provided for checking the speed of the chart paper and an accurate but inexpensive chart drive arrangement is provided.

Figure 1:
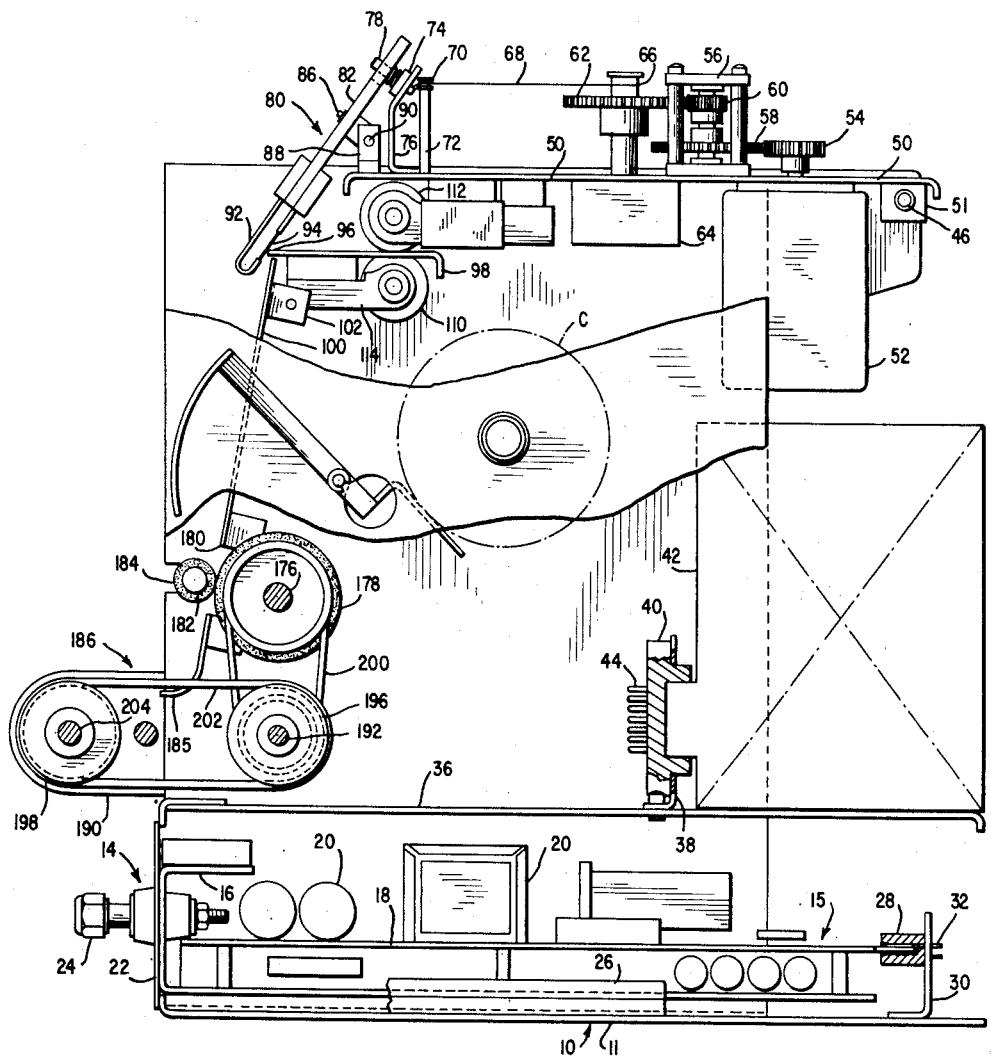
FIG. 1 is a side elevational view of the recorder of this invention with portions of the outside housing broken away for the sake of clarity and other portions shown in cross section.
Figure 2:
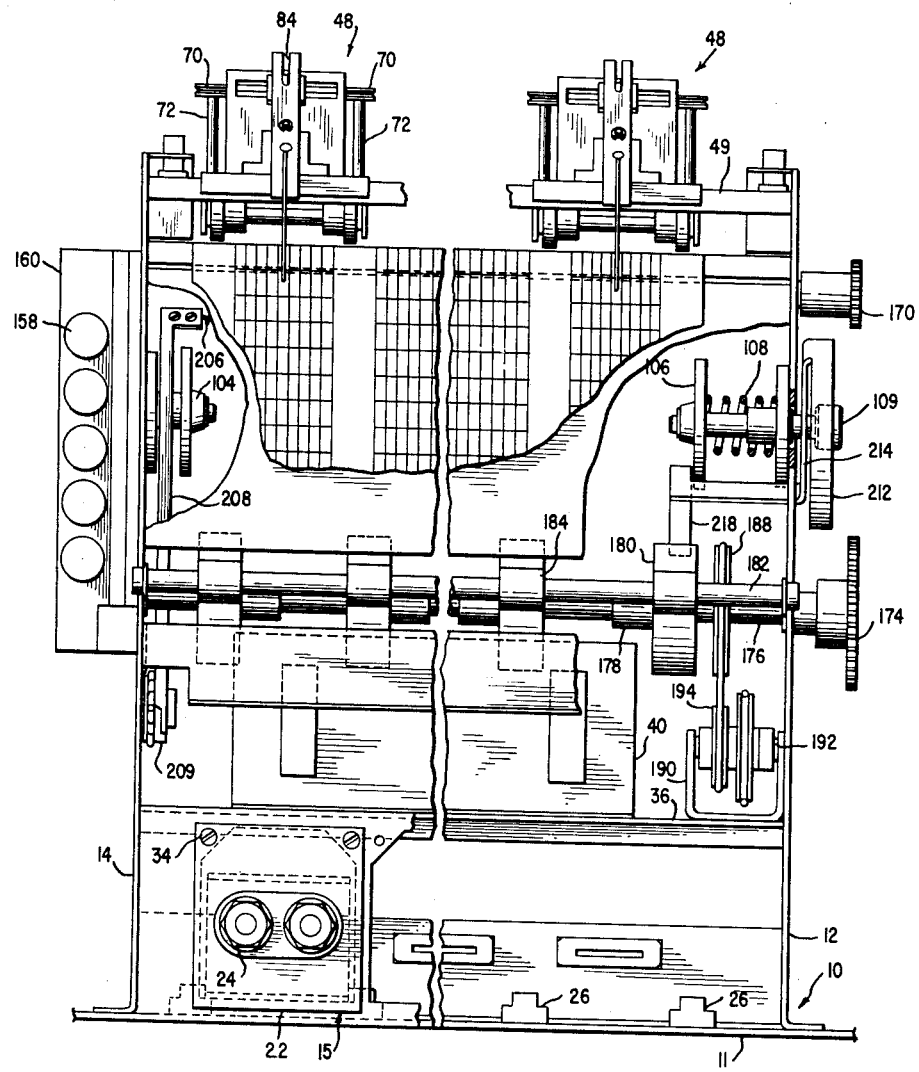
FIG. 2 is a front elevation view partially in section of a multichannel recorder constructed in accordance with the preferred embodiment of this invention.

Referring now to the drawings for a more detailed description, the recorder includes a support frame assembly 10 which has a suitable base plate 11 and a pair of side walls 12 and 14 secured thereto, see FIGS. 1 and 2. Adapted to be removably mounted on the base plate between the side walls near the bottom of the recorder from the front side thereof are a plurality of measuring circuit modules 15, there being one measuring circuit module for each channel of a multichannel recorder. The measuring circuit module would include the required and known electrical circuits for transferring the electrical input signal representing the variable to be recorded through an amplifier to the recorder.

The mechanical construction of the measuring circuit module includes a frame 16 supporting a circuit board 18. The circuit board has wired thereto conventional electrical components 20 for providing a particular desired measuring device. A face plate 22 is secured to the front of the frame 12 and a pair of input terminals 24 protrude through the front of the face plate for attaching lead in conductors for the input of the physical variable being measured.

Each measuring circuit module 15 is slidably and removably mounted in the frame 10 on a pair of T-shaped rails 26, FIG. 2. At the rear of the measuring circuit modules 15 in a multichannel recorder, there is a bracket 30 supporting a printed circuit board connector 28 for making connections with the circuits at the edge of the circuit board 18 and having terminals 32. For holding the measuring circuit modules 15 in position a pair of suitable screws 34 may be utilized. As can be seen from the foregoing, measuring circuit modules 15 are provided for each channel and may be readily interchanged and removed for either servicing or for interchanging the function or range of the recording channel.

The frame 10 includes an intermediate floor 36 secured to the side walls 12 and 14 and attached to the floor 36 is a bracket 38 carrying another circuit board connector 40. The circuit board connector 40 is for providing electrical connection to an amplifier board module 42. There is an amplifier board module 42 for each channel and it is positioned at the rear of the recorder behind the measuring circuit module for each channel. The amplifier board module contains electrical components secured thereto to provide a suitable amplifier circuit. Terminals 44 of the connector 40 are connected by wires (not shown) to appropriate terminals 32 to thus connect the electrical measuring circuit to the electrical amplifier circuit. Other of the terminals 34 are utilized to connect the amplifier circuit to the null self-balancing servo driven recorder circuit. Since the electrical circuits per se are known in the recorder art, and are not part of this invention, they are not described herein.

Secured between the side walls of the frame 10 at the top rear portion thereof is a cross bar 46 for pivotally supporting a servo rack and stylus module 48. Similar to the measuring circuit module 15 and amplifier board module 42, there is a servo rack and stylus module 48 for each channel of a multichannel recorder; see FIG. 2. The servo rack and stylus module 48 is pivotally mounted for movement about the cross rod 46 so that it may be swung upwardly as viewed in FIG. 1 for access to the interior of the recorder and for access to the bottom of the servo module. The downward movement of the servo module 48 is limited by a front cross bar 49 abutting against the servo module to limit its downward movement and to keep it substantially horizontal during recording. Suitable screws may be used to secure the servo module 48 to the bar 49.

The servo rack and stylus module 48 includes a servo support plate 50 which is secured by a suitable screws to a support bar 51 which in turn extends across the width of the machine and is pivotally mounted on the cross rod 46, FIG. 1. A servo motor 52 electrically connected by wires (not shown) to the terminals 44 is supported from the servo support plate 50 and includes a servo pinion 54.

An idler gear assembly support 56 is attached to the support plate 50 and includes a pair of idler gears 58 and 60 rigidly secured to an idler shaft. Idler gear 58 is in mesh with servo pinion 54 and idler pinion 60 is in mesh with a potentiometer gear 62. Potentiometer gear 62 is secured to a shaft of a potentiometer 64 which is mounted to the support plate 50. Above the potentiometer gear 62 is a potentiometer pulley 66 around which is trained a pen drive cable 68, FIGS. 1 and 3. The pen cable 68 is also trained around a pair of aligned pulleys 70 which are mounted on posts 72 secured to servo plate 50. The potentiometer 64 is mechanically linked to the servo motor 52 by suitable gears.

A stylus assembly 80 is carried by the servo rack and stylus module 48 and includes a stylus holder 82 having a drive slot 84 in the top end thereof. The drive slot 84 is provided for cooperation with drive pin 78 so that the stylus assembly will be driven in accordance with rotary movement of the servo motor 52. The stylus holder 82 is pivotally mounted about a pivot 86 so that as the drive pin 78 moves its upper end the lower end of the stylus holder may move. A bracket 88 attached to the support plate 50 carries another pivot 90 for pivotally mounting the entire stylus holder for movement about a horizontal axis. A stylus 92 is secured to the stylus holder 82 and includes an uncovered heated writing portion 94 for contacting heat sensitive chart paper C as it passes over a writing edge 96. The writing edge 96 is defined by an edge of a paper guide plate 98 secured to the frame assembly 10.

A chart plate 100 mounted on a bracket 102 is positioned below the stylus assembly 80 so that the chart paper after being recorded on can be easily viewed from a front window at the front of the recorder, see FIG. 2. The movement of the drive pin 78 is parallel to the writing edge 96 so that movements of the servo motor will faithfully reproduce corresponding movements of the stylus 92 and record the input variables on the chart paper.

The movement of the pen cable 68 causes the back end of the stylus assembly 80 to slide from either left to right or right to left as the case may be. Because of the mechanical arrangement between the writing edge 96, the stylus pivot 86 and the drive pin 78, the stylus moves at a ratio of 2 to 1. This ratio is linearly maintained throughout the entire range because the pen driving the stylus moves in a straight line contacting the stylus holder 82 along different portions of its slot 84, thus keeping the 2 to 1 ratio constant even though the stylus rotates about the pivot 86. The full sweep of the writing element, for example, would cover a width of 100 millimeters on a single channel machine and 80 millimeters on each channel of multi-channel machine.

The paper used as chart paper is a plastic coated heat sensitive paper. As the heated stylus contacts the paper it causes the paper to turn black in the area heated. Thus, as the paper moves and the heated stylus element moves, a black trace is left on the paper passing beneath the heated stylus at the writing edge 96.

The chart paper C is adapted to be mounted in a chart paper roll holding arrangement including a rotatably mounted roll holder 104 and an axially movable roll holder 106. A biasing spring 108 is provided for biasing the roll holder 106 toward the roll holder 104 to sandwich the ends of a roll of chart paper C therebetween. For removing a chart paper roll core, a knob 109 is provided so that the roll holder 106 may be axially withdrawn toward the edge of the side 12.

The chart paper is trained off the roll C over the paper guide plate 98 and is driven by a drive roller 110 backed up by a roller 112. Roller 112 is a printing roller having a printing surface 113 on the periphery thereof, see FIG. 5. The printing surface 113 has permanently raised characters and is similar to an endless rubber stamp. The chart paper C is supplied with the grid markings thereon in the center portion forming the graph part to be recorded on as shown in FIG. 7 at $C_g$ and the margins between the grids or graph portion $C_g$ are originally blank, $C_m$.

In order to record any number of functions or variables, the chart paper is printed on at the time it moves under the printing roller 112 by its printing surface 113. The printing roller and printing surface 113 can be removed and another printing roller and printing surface inserted for changing the fuctions or ranges of the variables to be recorded. As shown in FIG. 5, for example, there is a printing roller at each side of the margin for each channel of the graph.

The printing roller is biased downwardly against the drive roller 110 by a pressure spring 116. The drive rollers 110 are suitably journalled by support brackets 114, FIG. 1. An ink supply roller 118, FIGS. 4 and 5, is in contact with the printing surface periphery 113 of printing roller 112 to supply ink thereto. This ink is fed to the ink supply roller 118 by gravity from an ink felt 120 (or small ink bottle), there being one ink felt or ink bottle at each side of the servo rack and stylus module corresponding to each printing roller 112 for printing in each margin $C_m$ of the graph paper C.

The ink supply roller 118 and printing roller 112 of each module are mounted in a bracket 122 which is mounted on a pivot 124 to a mounting block 126. By this means the printing roll and ink supply roll assembly is pivotable away from the support plate 50 when the servo module is lifted for replacing the printing roll for printing different functions and ranges to be recorded.

As shown in FIGS. 6 and 7, the modularized recorder of this invention may also be utilized as a single channel recorder for recording multi-functions and multi-ranges of variables on the same chart paper C. In this case, the only modification need be a marker for marking through the margins of the chart paper as to which particular function and which particular range is being recorded. In FIG. 6, the servo rack and stylus module 48 is similar in construction to that used on a multi-channel recorder and the same components are designated by the same reference numerals. The principal additional difference concerns the marking or delineating which particular variable and which range within that fuction is being recorded. This is accomplished by the marking attachment 127 shown specifically in FIGS. 6 and 7. A bracket 128 journals an actuating shaft 130 and a marker drive shaft 132 at right angles to one another. Attached to each shaft near the point where they meet are a pair of bevel gears 134 and 136. A marking pen 138 is eccentrically mounted at the bottom of the shaft 132 so that by rotation of the shaft 130 through the drive of the gears 134 and 136, the marking pen 138 may be moved to various positions along the margin $C_m$ of the graph paper C as the graph paper is moving. As illustrated in FIG. 7 for example, the recorder is first recording D.C. current within the range of 1 ampere. Thus, the marking pen 138 at the bottom of the margin $C_m$ in FIG. 7 draws a line through the IDC on the left hand margin and the 1 a. 100 v. in the right hand margin. Later on it is desired to record a different function and range and this time the recording is of A.C. voltage of the range of 10 volts. In this case, the actuating shafts 130 are actuated by knob (not shown) on the front of the machine which in turn rotates the marking pen 138 about the center of shaft 132 until it is positioned to draw a line through the functional notation VAC and a similar marking pen on the right hand margin draws a line through the range 1 a. 10 v. As noted in FIG. 7, there are two identical marking assemblies, one assembly 140 for function marking and another assembly 142 which is identical in construction for range marking.

Figure 9:
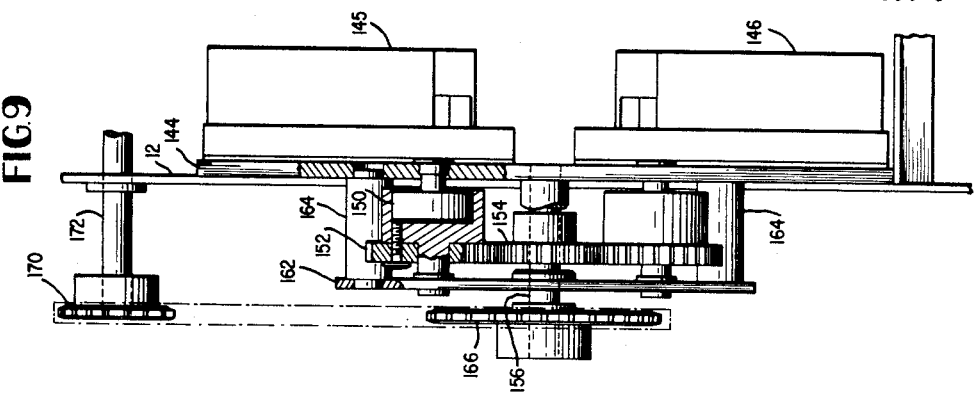
FIG. 9 is a sectional view taken along line 9—9 of FIG. 8 showing the details of the chart drive.
Figure 8:
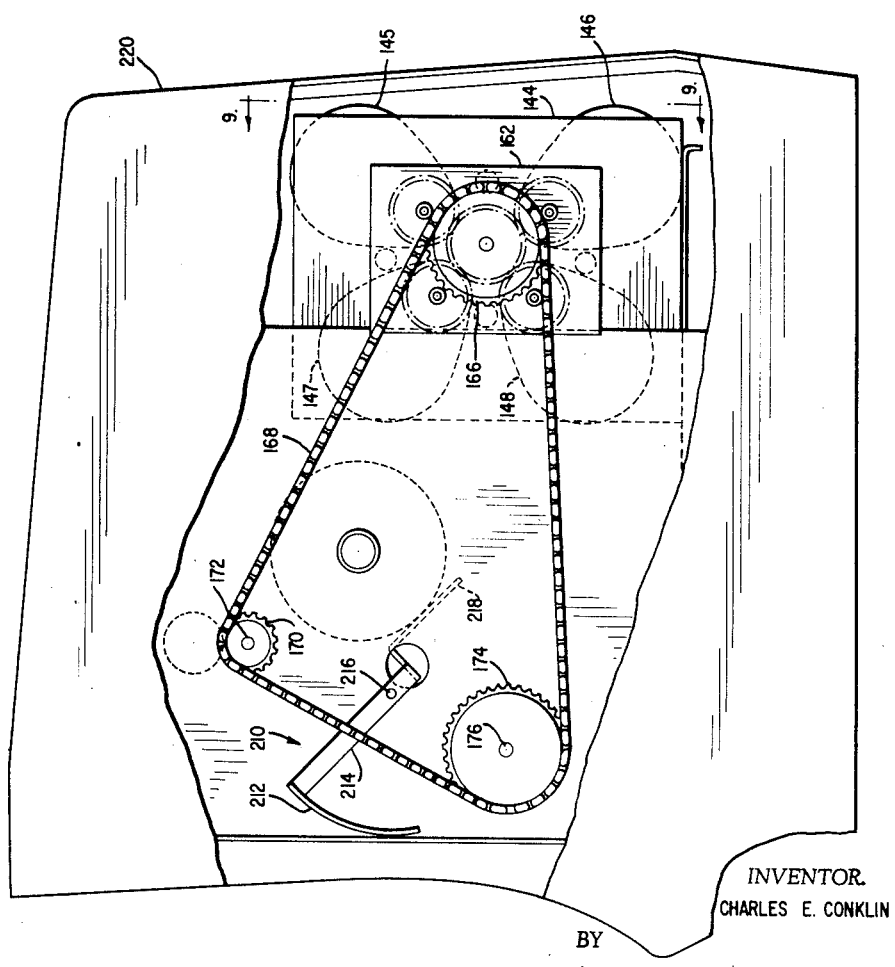
FIG. 8 is a side elevation view with a portion of the recorder housing broken away illustrating the chart drive and footage indicating features of the invention.

The drive for the chart of the recorder has extreme accuracy and is quite simple and inexpensive. This drive is shown best in FIGS. 8 and 9. A motor attachment plate 144 is secured to a side 12 of the frame assembly and has four synchronous motors 145, 146, 147 and 148 mounted thereon in a rosette pattern as shown in FIG. 8. Each motor drives through a conventional slip clutch 150 to a gear 152. Thus, there are four identical gears positioned around the periphery of a circle and within the circle is a master gear 154 secured to a drive shaft 156. Hence, each synchronous motor is connected to the master gear 154 through a slip clutch 150. Each of the motors is wired to its own speed selector button 158, FIG. 2, mounted in a chart drive speed selection plate 160 near the front of the recorder. As a particular motor selection button 158 is pushed, the motor connected thereto drives the master gear 154 at the particular speed through the slip clutch 150. The other three motors are not activated and are merely idle while the slip clutches are rotating.

A support plate 162 having a plurality of spacers 164 supports the front of the slip clutches and journals the drive shaft 156. A chain sprocket 166 is attached to the drive shaft 156 and a drive chain 168 is trained thereiaround. Drive chain 168 is also trained around a chart drive sprocket 170 secured to a shaft 172 for driving the chart drive rollers 110. The drive chain 168 is also trained around a sprocket 174 for driving chart wind-up rolls. The sprocket 174 is mounted to drive a shaft 176. As shown in FIGS. 1 and 2, shaft 176 carries a plurality of spaced rollers 178, one for each channel, and these rollers have a friction periphery adapted to contact the periphery of corresponding rollers 184 mounted on an idler shaft 182 positioned between the sides 12 and 14 of the frame assembly 10. The chart paper C is adapted to pass between these rollers and they oppose one another to pull the chart paper down across the viewing face of the recorder. Slots 180 in the chart face plate 100 allow the rolls 178 and 184 to contact the chart paper C. The bottom of the chart plate 100 has a curved lip 185 for directing the chart paper C outwardly from the recorder.

A reroll attachment may be provided on the recorder for rerolling the chart paper if such is desired. This reroll assembly 186 is shown in FIGS. 1 and 2 and includes a pulley 188 mounted on shaft 176 as well as a reroll pulley support bracket 190 secured to the intermediate floor 36 and the side 12 of frame assembly 10. An idler pulley shaft 192 is suppported in the bracket 190 and carries idler pulleys 194 and 196. A further pulley 198 is provided at the front of the bracket support 190 as shown in FIG. 1. A pulley belt 200 is trained over pulleys 188 and 194 for driving the idler shaft 192 and another pulley belt 202 is trained over pulleys 196 and 198 for driving a reroll shaft 204 attached to pulley 198. A suitable re-rolling core (not shown) is positioned on the shaft 204 to be driven thereby and suitably reroll the chart paper after it has been recorded on.

A timing marker is provided in order to ascertain correctly the speed that the chart was driven by inspecting the chart. This is provided by a timing marker 206 mounted on a timing marker arm 208. This timing marker arm is intermittently driven by a cam 209 at predetermined intervals of time. In this manner, at every predetermined interval of time the marker 206 will mark on the margin of the chart and the distance the chart travels in this predetermined interval of time will determine the speed of the chart drive and the permanent markings will be on the chart. A suitable timing motor arrangement (not shown) is adapted to drive the cam to cause the pen 206 to mark in timed intervals.

For indicating the amount of footage remaining on the roll of chart paper C, there is provided a footage indicator assembly 210 also shown in FIGS. 1 and 2. This footage indicator includes an indicating face 212 arcuate in shape and containing suitable markings thereon which face is attached to an indicating arm 214, the indicating arm 214 is pivotably mounted about a suitable pivot 216 and includes an offset roll contact arm 218 for contacting the periphery of the chart paper roll. The weight of the assembly biases the contact arm 218 against the graph paper chart roll, so that it always bears thereagainst. As the diameter of the chart paper roll decreases, the indicating face 212 will fall downwardly and indicate that there is less chart paper by the means of suitable markings at the front of the recorder.

Although the recorder is shown in most of the drawings without a cover to illustrate the component parts, it is contemplated that the recorder will be provided with a suitable, removable cover 220 having an opening for viewing the chart and for access to the controls such as the motor speed selector buttons, the footage indicator and the like.

Although the operation of the recorder and the novel and useful features are believed evident from the foregoing description, a brief summary will now be given in which the operation will be described.

Chart paper having unmarked margins is placed on the chart paper roll by withdrawing the knob 109 after the servo modules 48 are tilted upwardly giving access to the rear of the instrument. The chart paper C is threaded between drive rolls 110 and printing rolls 112, pull down rolls 178 and 184 and on to the reroll assembly 186. The paper moves through the recorder and the various channels may be chosen for recording different variables by appropriate selection of the measuring circuit module 15 and amplifier modules 42. As noted in the above description these modules are easily interchangeable as in the servo module 48. The particular range and function to be recorded on the graph having been determined, the printing roller 112 is provided with a corresponding printing band 113 so that the function and range may be printed on the periphery.

As the recorder is set in operation, the potentiometer 52 drives the stylus 92 through the gear train and pulley arrangement described above and in accordance with the usual null self-balancing recording method to record variations in the function which is supplied to the input terminals 24 of the measuring circuit modules 15. The record drawn on the heat sensitive chart paper by the heated stylus portion 94 and the function and range printing accomplished by printing roll 112 is viewable from the front of the recorder. The speed or recording which includes the speed of drive of the chart paper can be selected by selecting any one of the drive motors 145, 146, 147 and 148. The chart paper C may be rewound by the rewind assembly 186 and the footage remaining on the roll is visible from the front of the recorder by means of the footage indicator assembly 210. The speed at which the chart paper is being driven is indicated on the margin of the chart paper by marker 206 intermittently operated at predetermined periods of time.

In the modification shown in FIGS. 6 and 7, multifunctions and ranges may be recorded and marked on the same chart paper by a printing roll which prints the multiple functions and ranges and a marking pen which marks through the selected one being recorded.

While there has been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefor, to be limited only as indicated by the scope of the following claims.

What is claimed is:
1. A null self-balancing electrical measuring recorder comprising;
 (a) a support carrying pluggable type electric connectors,
 (b) an input variable measuring circuit module assembly removably pluggable to the connectors on the support,
 (c) an amplifier circuit module assembly removably pluggable to the connectors on said support,
 (d) a pivotable servo motor rack and stylus module, the entire module pivotably supported from the top rear of the support,
 (e) electrical means connecting the electric connectors, measuring circuit module, amplifier circuit module and pivotable servo motor rack and stylus module when the same are secured to the support in their operative position,
 (f) means for supporting a roll of chart paper with unprinted margins in the support,
 (g) means for driving the chart paper beneath a stylus on the servo rack and stylus module to thereby continually record a visible indication of an input variable applied to the measuring circuit module, and
 (h) a removable printing cylinder carried by the servo rack and stylus module for continuously printing a function and range of the input variable on a margin of the chart paper.

2. A null self-balancing electrical measuring recorder comprising;
 (a) a support frame, carrying pluggable electrical connectors adjacent the bottom and rear thereof,
 (b) an input variable measuring circuit module removably pluggable into the electrical connector in the bottom of the support frame,
 (c) an amplifier circuit module pluggable into the connector supported in the rear of the support frame,
 (d) a servo rack and stylus module including a servo motor, balancing potentiometer and stylus, the entire module being pivotably supported from across the top rear portion of the support frame,
 (e) means for removably supporting a roll of chart paper within the frame,
 (f) and means for driving the chart paper beneath the stylus carried by the servo rack and stylus module to thereby continuously record a visible indication of an input variable applied to the measuring circuit module.

3. A null self-balancing electrical measuring recorder as defined in claim 2 further comprising;
 (a) a removable printing surface carried by the servo rack and stylus module and contacting the chart paper to continuously print range and function scales on the chart paper.

4. A null self-balancing electrical measuring recorder as defined in claim 3 wherein the servo rack and stylus module further comprises;
 (a) a support plate forming a portion of the pivotable connection to the support frame,
 (b) a servo motor attached to the support plate,
 (c) a potentiometer attached to the support plate,
 (d) a gear train connecting the servo motor and potentiometer,
 (e) a stylus assembly pivotally mounted to the support plate,
 (f) a heated stylus carried by the stylus assembly,
 (g) a stylus drive means including a cable attached to the potentiometer for driving the stylus.

5. A null self-balancing electrical measuring recorder as defined in claim 4 further comprising means defining a sharp writing edge on the surface of the support frame beneath the stylus and transverse to the movement of the chart paper.

6. A null self-balancing electrical measuring recorder as defined in claim 5 further comprising a mounting arrangement for the stylus drive to provide linear movement of the stylus over the writing edge during all positions of the stylus even though the stylus is pivotally mounted.

7. A null self-balancing electrical measuring recorder as defined in claim 2 wherein the chart drive means includes;
 (a) a plurality of synchronous motors secured to the frame,
 (b) a slip clutch for each motor,
 (c) separate actuating means for actuating each motor,
 (d) a common drive output gear connected to all the slip clutch outputs such that whichever motor is actuated will drive the output gear,
 (e) means for connecting the output gear to drive the chart.

8. A null self-balancing electrical measuring recorder as defined in claim 7 further comprising chart reroll means, the chart reroll means including;
 (a) a chart reroll shaft,
 (b) pulley and belt means for driving the chart reroll shaft,
 (c) a removable bracket supporting the chart reroll shaft and the pulley and belt means for driving the shaft,
 (d) and means to drive the pulley and belt means from the output gear of the chart drive.

9. A null self-balancing potentiometric recorder comprising;
 (a) a support frame,
 (b) electrical connections carried by the support frame,
 (c) a measuring circuit module removably pluggable into said connectors from the bottom front of the support frame,
 (d) an amplifier circuit module removably pluggable into said connectors from the rear of said frame,
 (e) a servo rack and stylus module including a servo motor, balancing potentiometer and heated stylus pivotally supported from the top rear of the frame,
 (f) means for supporting a roll of heat-sensitive chart paper within the frame,
 (g) means for driving the chart paper beneath the stylus carried by the servo rack and stylus module,
 (h) removable means for printing in more than one line of the margin of the chart paper as it moves through the recorder,
 (i) and selective marking means for marking one of the lines printed by the printing means to thereby identify range and function of more than one choice of range and function variables.

10. A null self-balancing potentiometric recorder as defined in claim 9 wherein the removable means for printing in the margin includes a printing roller with a removable resilient printing band carrying raised characters and further wherein the selective marking means is an eccentrically mounted marking pin mechanically connected to a selecting shaft.

11. A potentiometric recorder comprising;
 (a) a support frame,
 (b) electrical connections and pluggable connectors secured to the support frame,
 (c) a plurality of input variable measuring circuit modules removably pluggable into electrical connections from the bottom of the support frame and positioned side by side, each module having the same over-all dimensions and the same pluggable connections,
 (d) a plurality of amplifier circuit modules, each removably pluggable into the connectors from the rear of the support frame and positioned side by side, each amplifier circuit module being substantially the same over-all dimensions and having the same pluggable connections, there being one amplifier circuit module for each input measuring circuit module at each channel of the recorder,
 (e) a plurality of servo rack and stylus modules including a servo motor balancing potentiometer and stylus mechanically interconnected, the interconnected modules being pivotally mounted from across the top rear of the support frame and removable therefrom, each of the servo rack and stylus modules being mounted side by side and there being a single servo rack and stylus module for each channel of the recorder and, hence, for each measuring circuit module and amplifier circuit module,
 (f) and means for supporting and driving chart paper below the stylus on the chart for marking thereon.

12. A potentiometric recorder as defined in claim 11 further comprising a removable continuously rotatable printing cylinder on each of the servo rack and stylus modules for continuously printing range and functions of the input variable in the margin of the chart paper as the chart paper moves through the recorder.

13. In combination with a potentiometric recorder, a servo rack and stylus module adapted to be removably secured to the recorder, the module comprising in combination;
 (a) a support plate,
 (b) a servo motor attached to the support plate,
 (c) a balancing potentiometer attached to the support plate,
 (d) a gear train connecting the potentiometer and servo motor for rotation,
 (e) a stylus assembly pivotally mounted to the support plate,
 (f) a heated stylus carried by the stylus assembly,
 (g) stylus drive means including a cable attached to the potentiometer for driving the stylus in a linear manner,
 (h) a removable printing cylinder carried by the servo rack and stylus module for continuously printing on the chart paper as it is being recorded upon,
 (i) and a mechanical linkage for moving the stylus in a linear manner at a predetermined ratio across a writing surface on the chart paper.

References Cited by the Examiner
UNITED STATES PATENTS

| | | | |
|---|---|---|---|
| 2,113,748 | 4/38 | Ross et al. | 346—44 |
| 2,454,966 | 11/48 | Faus | 346—112 |
| 2,637,619 | 5/53 | Stein | 346—32 |
| 3,015,536 | 1/62 | Nielsen et al. | 346—32 X |

LEYLAND M. MARTIN, *Primary Examiner.*
LEO SMILOW, *Examiner.*